US012666158B2

(12) United States Patent (10) Patent No.: US 12,666,158 B2
Chan et al. (45) Date of Patent: Jun. 23, 2026

(54) GAIN MAP GENERATION, EMBEDDING, AND APPLICATION FOR HIGH DYNAMIC RANGE DIGITAL IMAGE FUNCTIONALITY

(71) Applicant: Adobe Inc., San Jose, CA (US)

(72) Inventors: Eric Chan, Belmont, MA (US); Thomas F. Knoll, Ann Arbor, MI (US)

(73) Assignee: Adobe Inc., San Jose, CA (US)

( * ) Notice: Subject to any disclaimer, the term of this patent is extended or adjusted under 35 U.S.C. 154(b) by 213 days.

(21) Appl. No.: 18/149,995

(22) Filed: Jan. 4, 2023

(65) Prior Publication Data

US 2024/0223910 A1 Jul. 4, 2024

(51) Int. Cl.
| | |
|---|---|
| *H04N 23/741* | (2023.01) |
| *G06T 1/00* | (2006.01) |
| *G06T 3/40* | (2024.01) |
| *G06T 7/90* | (2017.01) |
| *G06V 10/60* | (2022.01) |
| *H04N 23/63* | (2023.01) |

(52) U.S. Cl.
CPC ......... *H04N 23/741* (2023.01); *G06T 1/0021* (2013.01); *G06T 3/40* (2013.01); *G06T 7/90* (2017.01); *G06V 10/60* (2022.01); *H04N 23/632* (2023.01); *G06T 2207/10024* (2013.01); *G06T 2207/20208* (2013.01)

(58) Field of Classification Search
CPC .. H04N 23/741; H04N 23/632; G06T 1/0021; G06T 3/40; G06T 7/90; G06T 2207/10024; G06T 2207/20208; G06V 10/60
USPC ....................................................... 382/274
See application file for complete search history.

(56) References Cited

U.S. PATENT DOCUMENTS

| | | | |
|---|---|---|---|
| 9,264,681 B2 | 2/2016 | Gish et al. | |
| 10,467,735 B2 * | 11/2019 | Pouli ........................ | G06T 7/90 |
| 12,597,181 B2 | 4/2026 | Chan et al. | |
| 12,602,841 B2 | 4/2026 | Chan et al. | |
| 2006/0153445 A1 | 7/2006 | Lin | |
| 2007/0269132 A1 | 11/2007 | Duan et al. | |

(Continued)

FOREIGN PATENT DOCUMENTS

EP 3340167 A1 6/2018

OTHER PUBLICATIONS

Chan, Eric , et al., "Pursuant to MPEP § 2001.06(b) the applicant brings the following co-pending application to the Examiner's attention:", U.S. Appl. No. 18/149,995, filed Jan. 4, 2023, 64 pages.

(Continued)

*Primary Examiner* — Chineyere Wills-Burns
*Assistant Examiner* — Lucius Cameron Gree Allen
(74) *Attorney, Agent, or Firm* — FIG. 1 Patents

(57) ABSTRACT

Gain map generation, embedding, and application for high dynamic range digital image functionality are described. In one example, a gain map is generated based on a digital image, e.g., as a ratio of a standard dynamic range digital image and a high dynamic range digital image. The gain map is configured to adjust an amount of gain of a digital image between a high dynamic range (HDR) and a standard dynamic range (SDR). Metadata is generated based on the gain map. The metadata describes how the gain map is to be applied to the digital image as part of rendering. The gain map, the metadata, and the digital image are embedded within a digital image file and stored.

20 Claims, 12 Drawing Sheets

(56)  References Cited

U.S. PATENT DOCUMENTS

| | | | |
|---|---|---|---|
| 2008/0130994 A1 | 6/2008 | Lin | |
| 2011/0123168 A1* | 5/2011 | Cho | H04N 21/812 |
| | | | 386/230 |
| 2012/0113130 A1* | 5/2012 | Zhai | G06T 5/94 |
| | | | 345/589 |
| 2014/0152694 A1* | 6/2014 | Narasimha | G06T 5/94 |
| | | | 345/629 |
| 2016/0358584 A1 | 12/2016 | Greenebaum et al. | |
| 2017/0116963 A1* | 4/2017 | Wanat | G09G 3/3406 |
| 2018/0005357 A1* | 1/2018 | Lasserre | H04N 5/57 |
| 2018/0063500 A1* | 3/2018 | Rusanovskyy | H04N 19/176 |
| 2018/0182081 A1* | 6/2018 | Chesnokov | G06T 5/50 |
| 2018/0336669 A1 | 11/2018 | Mertens | |
| 2019/0043177 A1* | 2/2019 | Nishimura | G06T 5/94 |
| 2019/0156468 A1* | 5/2019 | Olivier | G06T 5/92 |
| 2019/0172187 A1 | 6/2019 | Knibbeler et al. | |
| 2019/0246043 A1 | 8/2019 | Gunji | |
| 2019/0295504 A1 | 9/2019 | Xiong et al. | |
| 2020/0013151 A1* | 1/2020 | Atkins | G06T 5/92 |
| 2020/0053271 A1 | 2/2020 | Aiba | |
| 2020/0288082 A1* | 9/2020 | Matsuda | H04N 9/646 |
| 2021/0096023 A1* | 4/2021 | Yang | G06T 5/92 |
| 2021/0168340 A1 | 6/2021 | Mochizuki | |
| 2021/0168344 A1* | 6/2021 | Lee | H04N 23/741 |
| 2022/0044615 A1* | 2/2022 | Pytlarz | G09G 5/10 |
| 2022/0086467 A1* | 3/2022 | Messmer | H04N 19/30 |
| 2022/0092749 A1* | 3/2022 | Johnson | H04N 23/71 |
| 2025/0117977 A1 | 4/2025 | Chan et al. | |
| 2025/0117993 A1 | 4/2025 | Chan et al. | |

OTHER PUBLICATIONS

Chan, Eric , et al., "Pursuant to MPEP § 2001.06(b) the applicant brings the following co-pending application to the Examiner's attention:", U.S. Appl. No. 18/481,379, filed Oct. 5, 2023, 65 pages.

Chan, Eric , et al., "Pursuant to MPEP § 2001.06(b) the applicant brings the following co-pending application to the Examiner's attention:", U.S. Appl. No. 18/481,437, filed Oct. 5, 2023, 66 pages.

GB2407763.8 , "Foreign Office Action", GB Application No. GB2407763.8, Oct. 2, 2024, 6 pages.

"Canon DP-V2730 Professional Display—Canon Europe", <www.canon-europe.com/professional-monitors/dp-v2730/>, 2022, 24 pages.

"Non-Final Office Action", U.S. Appl. No. 18/481,379, filed May 20, 2025, 16 pages.

"Non-Final Office Action", U.S. Appl. No. 18/481,437, filed May 28, 2025, 15 pages.

Gore, "Understanding Your Histogram: Part 2—Color—Light and Matter", <www.lightandmatter.org/2011/general-photography-articles/understanding-your-histogram-part-2-color/>, 2011, 16 pages.

"Final Office Action", U.S. Appl. No. 18/481,379, filed Sep. 16, 2025, 18 pages.

"Notice of Allowance", U.S. Appl. No. 18/481,379, filed Nov. 17, 2025, 6 pages.

"Final Office Action", U.S. Appl. No. 18/481,437, filed Oct. 21, 2025, 18 pages.

Notice of Allowance issued in U.S. Appl. No. 18/481,437, mailed Dec. 18, 2025, 8 pages.

* cited by examiner

100

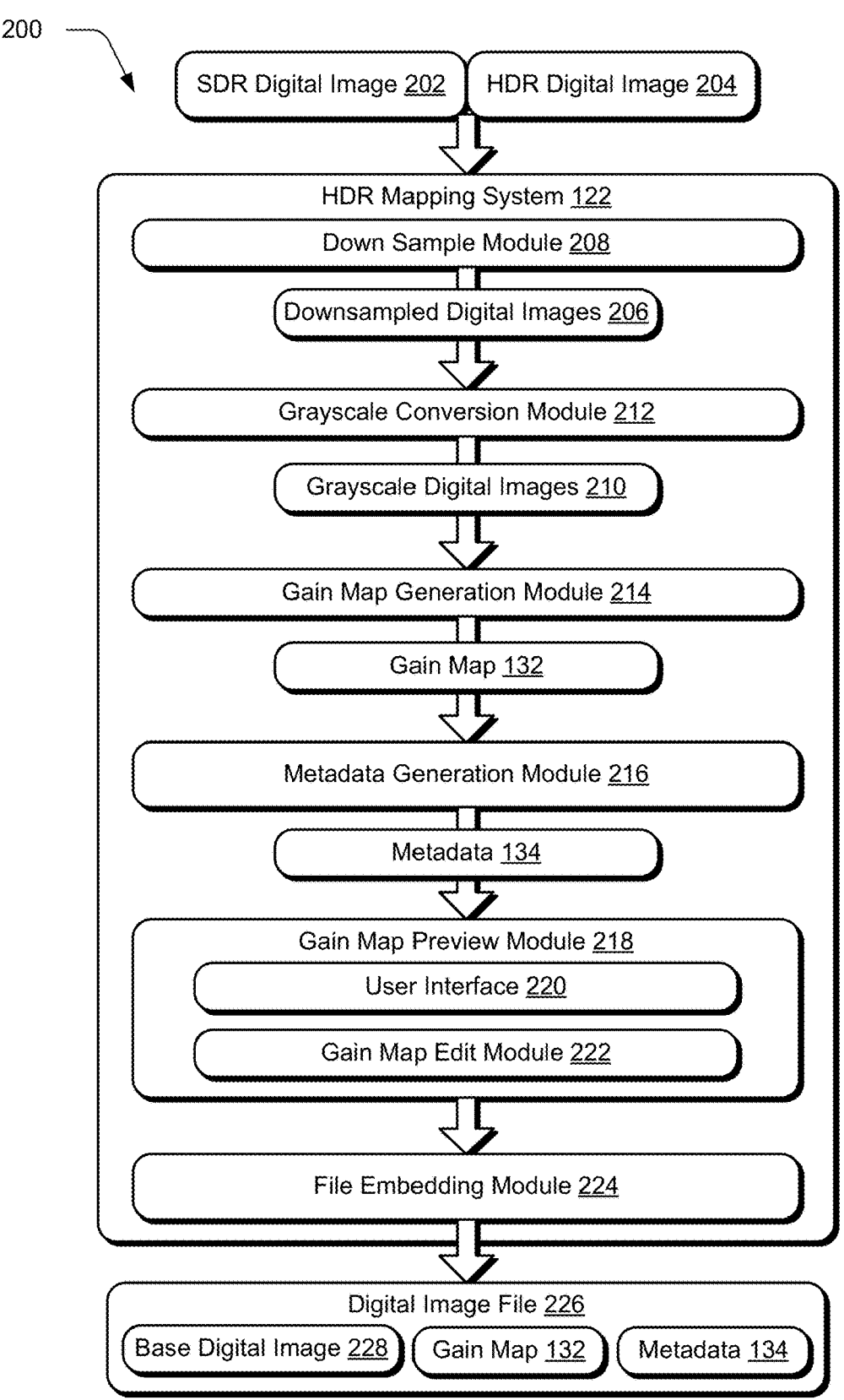

200

SDR Digital Image 202    HDR Digital Image 204

HDR Mapping System 122

Down Sample Module 208

Downsampled Digital Images 206

Grayscale Conversion Module 212

Grayscale Digital Images 210

Gain Map Generation Module 214

Gain Map 132

Metadata Generation Module 216

Metadata 134

Gain Map Preview Module 218

User Interface 220

Gain Map Edit Module 222

File Embedding Module 224

Digital Image File 226

Base Digital Image 228    Gain Map 132    Metadata 134

Gain Map Generation Module 214

HDR Digital Image 204

÷

SDR Digital Image 202

$\log_2$

Gain Map 132

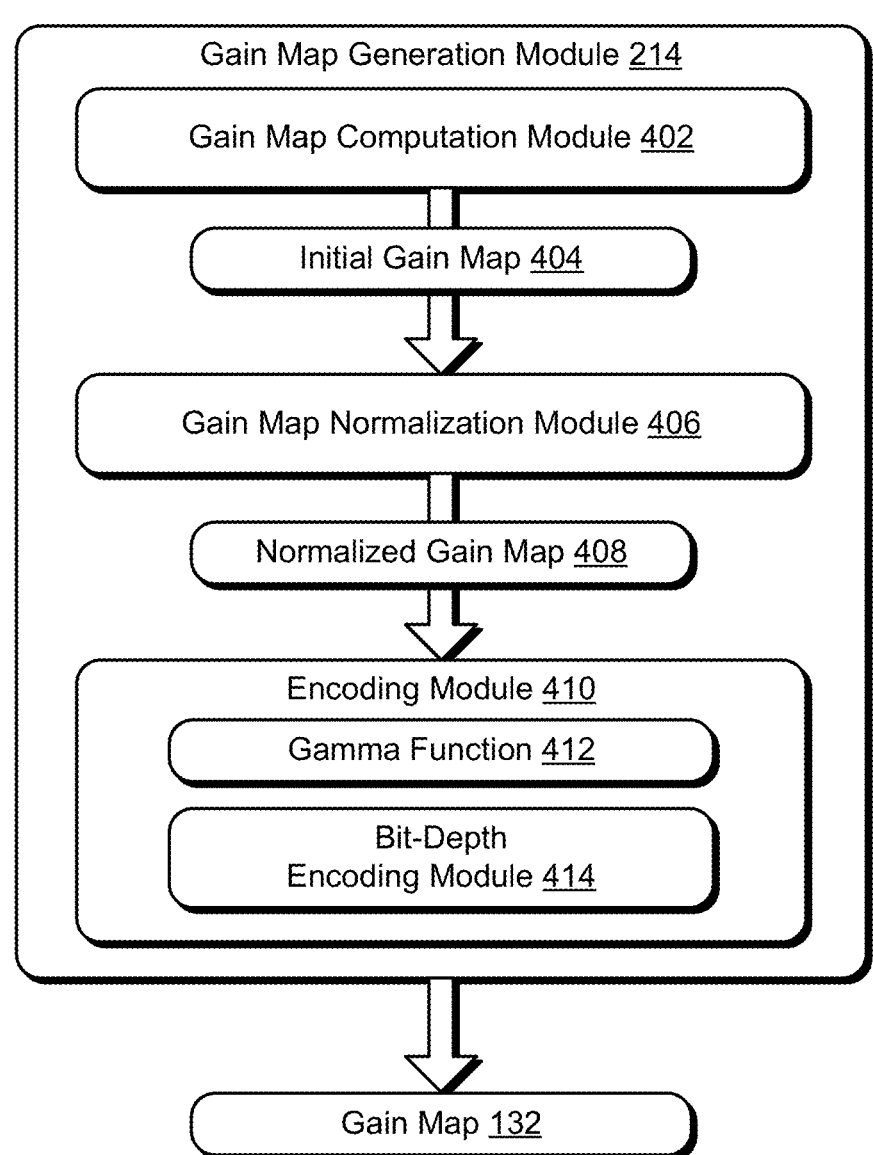
Fig. 4

500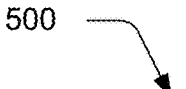

```
vec3 CalculateGainMap (image2d sdrRendition,
                       image2d hdrRendition,
                       vec2 position)
{

// Read SDR rendition. This should be gamma 1.0.

vec3 sdr = ReadImage (sdrRendition, position);

// Read HDR rendition. This should be gamma 1.0 and
  // have the same RGB primaries as the SDR rendition.

vec3 hdr = ReadImage (hdrRendition, position);

// Avoid negative values.

sdr = max (sdr, vec3 (0.0f));
  hdr = max (hdr, vec3 (0.0f));

// Offset parameters, which need to be written to the
  // Gain Map metadata so that the transform can be reversed later.

constexpr vec3 k1 = vec3 (1.0-5f);
  constexpr vec3 k2 = vec3 (1.0-5f);

// Calculate gain map in log2 space.

return log2 ((hdr + k1) / (sdr + k2));

}
```

Gain Map Generation Module 214

Gain Control 602

HDR Mapping System 122

Gain Map Preview Module 218

User Interface 220

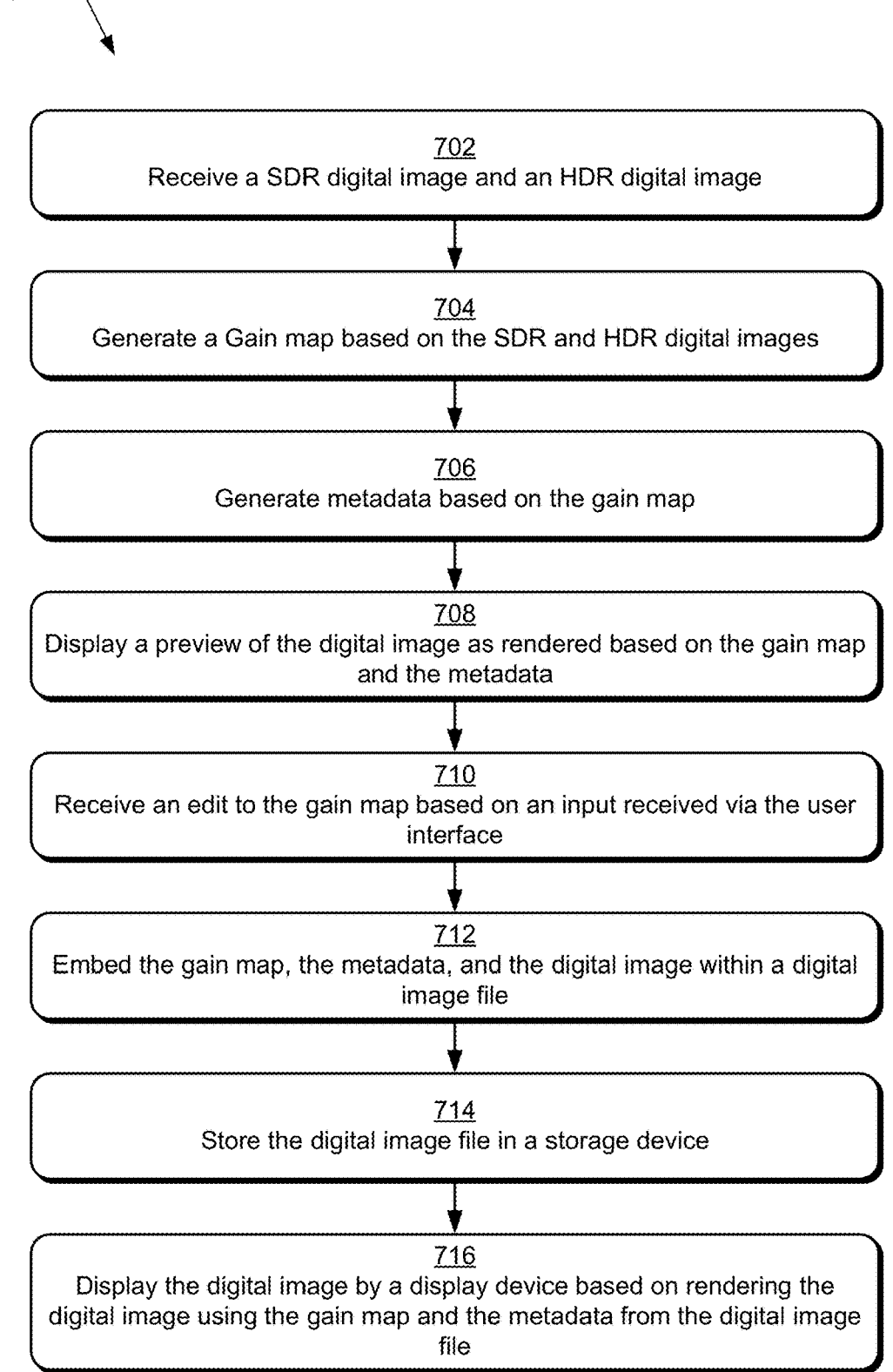

700

702
Receive a SDR digital image and an HDR digital image

704
Generate a Gain map based on the SDR and HDR digital images

706
Generate metadata based on the gain map

708
Display a preview of the digital image as rendered based on the gain map and the metadata

710
Receive an edit to the gain map based on an input received via the user interface

712
Embed the gain map, the metadata, and the digital image within a digital image file

714
Store the digital image file in a storage device

716
Display the digital image by a display device based on rendering the digital image using the gain map and the metadata from the digital image file

900

```
vec3 ApplyGainMap (image2d baseImage,
                   image2d gainMap,
                   vec2 position,
                   float w, // weight W or W'
                   vec3 gainMapMin,      // from gain map metadata
                   vec3 gainMapMax,      // from gain map metadata
                   vec3 gainMapGamma,    // from gain map metadata
                   vec3 offsetBase,      // from gain map metadata
                   vec3 offsetOther)     // from gain map metadata
{

// Read base image (e.g., SDR). This should be gamma 1.0.

vec3 base = ReadImage (baseImage, position);

// Read gain map in normalized [0,1] space.

vec3 gainMapEncoded = ReadImage (gainMap, position);

// Undo gamma & affine transform; result is in log 2 space.

vec3 gainMapLog2 = lerp (gainMapMin,
                         gainMapMax,
                         pow (gainMapEncoded, vec3 (1.0) / gainMapGamma));

// Apply weighted gain map to image.
//
// If Base = SDR, then offsetBase is k_sdr and offsetOther is k_hdr.
// If Base = HDR, then offsetBase is k_hdr and offsetOther is k_sdr.

return ((base + offsetBase) * exp2 (gainMapLog2 * w)) - offsetOther;

}
```

Gain Map Application Module 820

Fig. 9

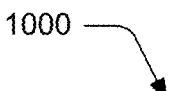
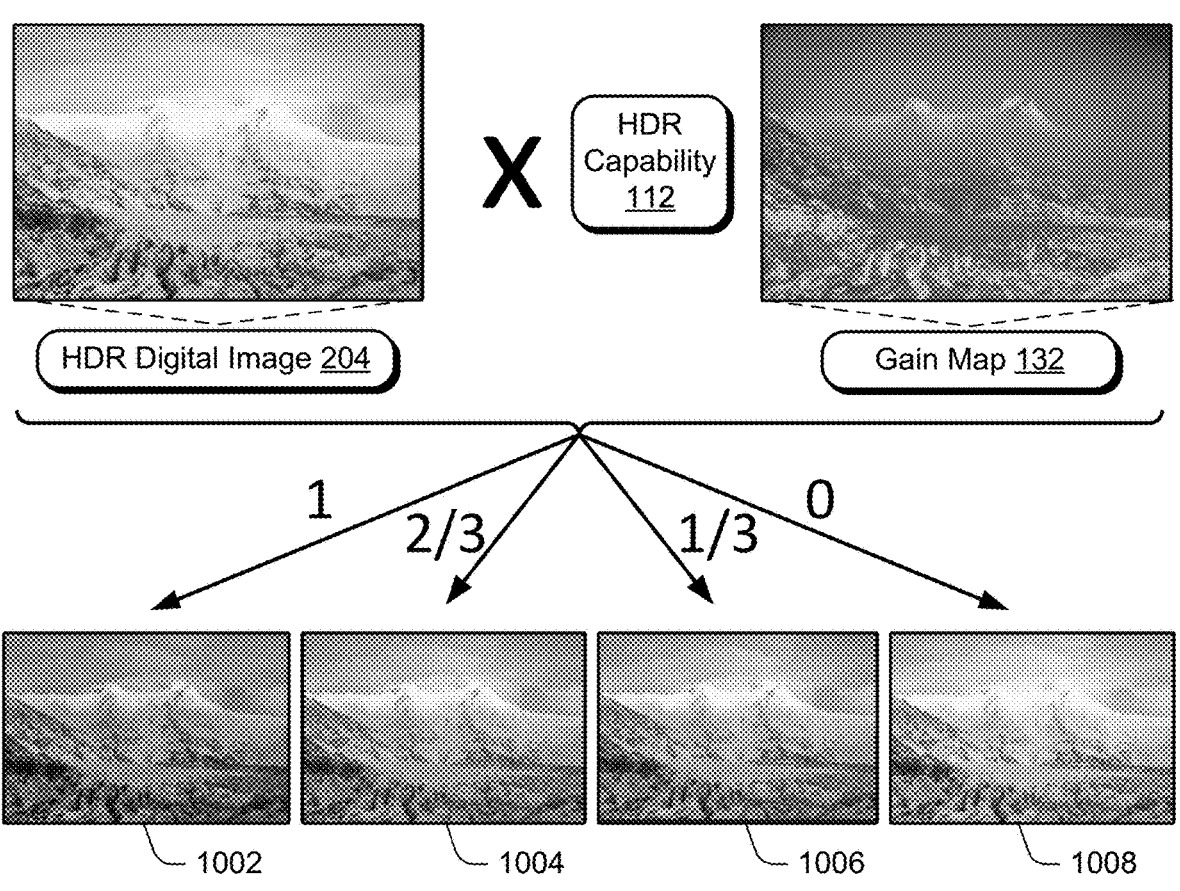
Fig. 10

1100

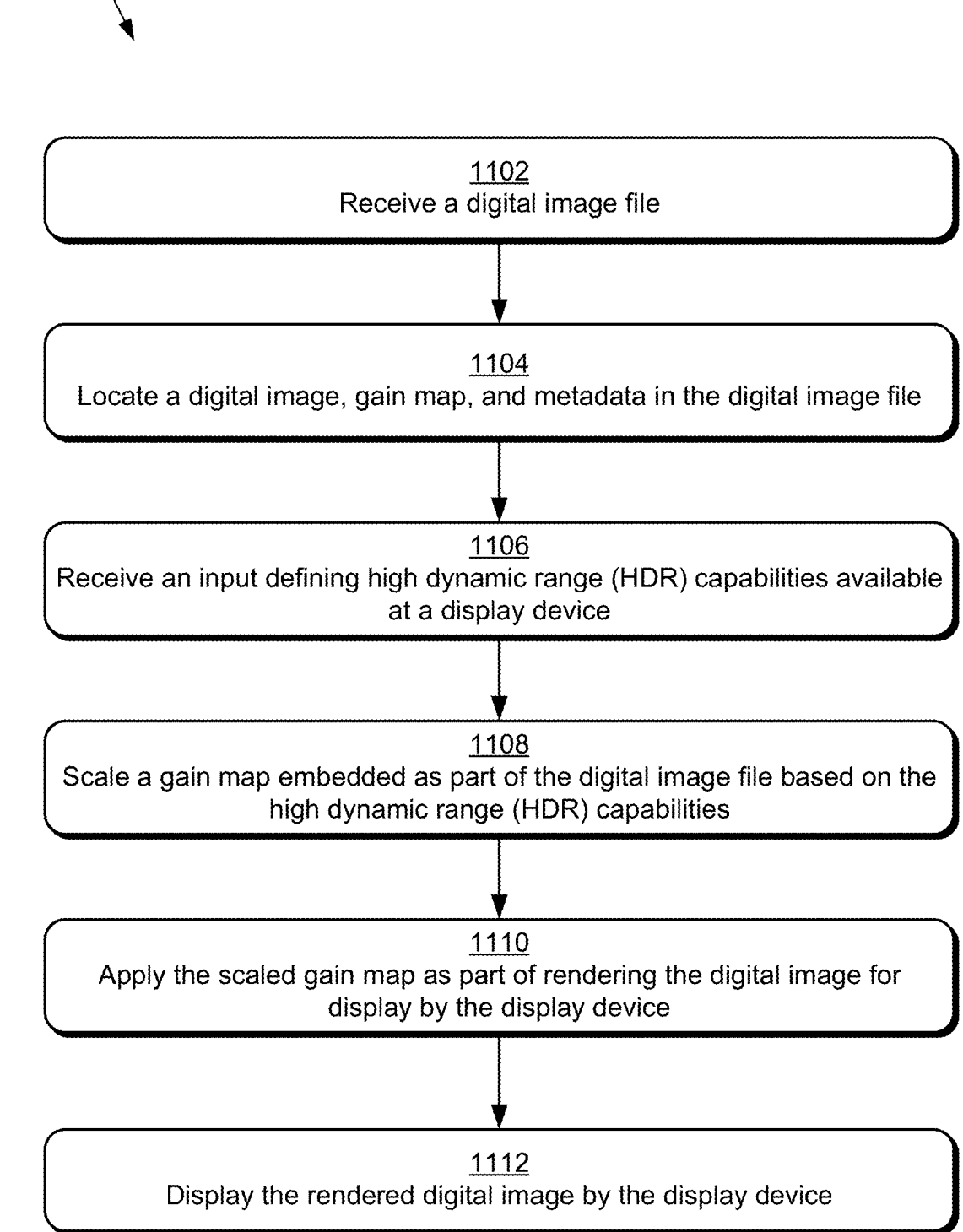

1102
Receive a digital image file

1104
Locate a digital image, gain map, and metadata in the digital image file

1106
Receive an input defining high dynamic range (HDR) capabilities available at a display device 1108
Scale a gain map embedded as part of the digital image file based on the high dynamic range (HDR) capabilities 1110
Apply the scaled gain map as part of rendering the digital image for display by the display device 1112
Display the rendered digital image by the display device

Platform 1216

Resources 1218

Cloud 1214

Computing Device 1202

Processing Device 1204

Hardware Elements 1210

Computer-readable Media 1206

Memory/ Storage 1212

I/O Interfaces 1208

HDR Mapping System 122

HDR Display System 124

GAIN MAP GENERATION, EMBEDDING, AND APPLICATION FOR HIGH DYNAMIC RANGE DIGITAL IMAGE FUNCTIONALITY

BACKGROUND

High dynamic range (HDR) as applied to digital images refers to luminosity calculations (i.e., lighting) performed in a high dynamic range that supports a larger range of values when compared with values available in a standard dynamic range (SDR). Through use of high dynamic range functionality, bright objects in a digital appear brighter when displayed by a display device, dark objects appear darker, and details in the digital image have increased visibility that otherwise are lost due to limitations in contrast ratios in a conventional standard dynamic range. Conventional techniques used to implement high dynamic range functionality by display devices, however, vary between display devices and implementations used to support those display devices. This variance results in inconsistencies and reduced display functionality in real world scenarios.

SUMMARY

Gain map generation, embedding, and application for high dynamic range digital image functionality are described. In one example, a gain map is generated based on a digital image, e.g., as a ratio of a standard dynamic range digital image and a high dynamic range digital image. The gain map is configured to adjust an amount of gain of a digital image between a high dynamic range (HDR) and a standard dynamic range (SDR). Metadata is generated based on the gain map. The metadata describes how the gain map is to be applied to the digital image as part of rendering. The gain map, the metadata, and the digital image are embedded within a digital image file and stored.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 2 depicts a system in an example implementation showing operation of a HDR mapping system of FIG. 1 in greater detail as generating a digital image file that includes a base digital image, gain map, and metadata.

FIG. 4 depicts another example implementation showing operation of a gain map generation module in greater detail.

FIG. 5 depicts an example implementation of pseudocode for generating a gain map as employed by a gain map generation module.

FIG. 7 depicts a procedure in an example implementation of digital image file formation to include a digital image and embedded gain map and metadata.

FIG. 9 depicts an example implementation of pseudocode for applying a gain map to a digital image.

FIG. 10 depicts an example implementation of scaling a gain map as part of applying the gain map to a digital image.

FIG. 11 is a flow diagram depicting a procedure in an example implementation of application of a gain map to a digital image based on metadata, the gain map, metadata, and digital image embedded within a digital image file.

DETAILED DESCRIPTION

Overview

Figure 1:
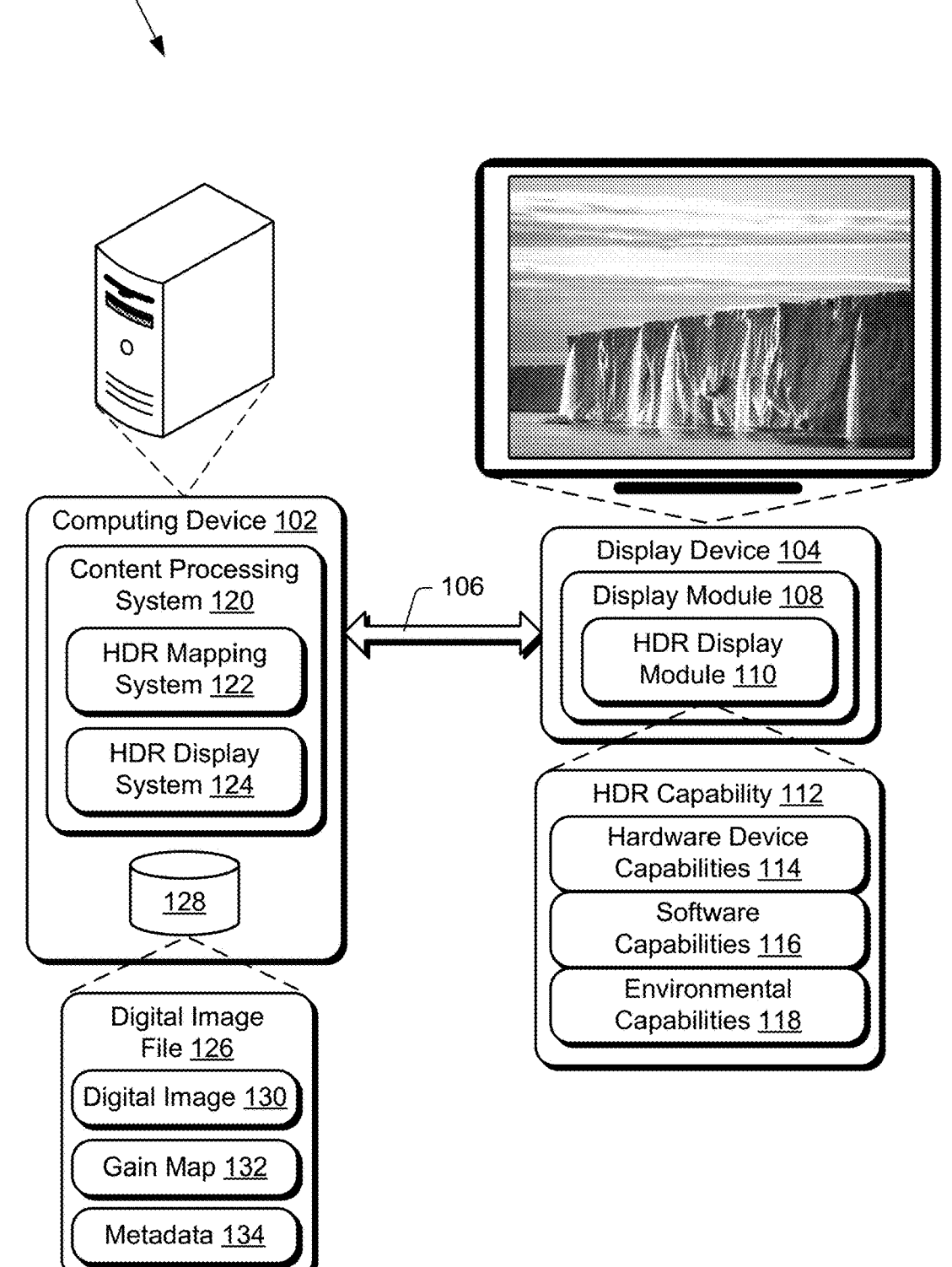
FIG. 1 is an illustration of a digital medium environment in an example implementation that is operable to employ gain map generation, embedding, and application for high dynamic range digital image functionality as described herein.

High dynamic range (HDR) has been developed to support an increased range of luminosity values as part of rendering a digital image for display on a display device. However, display devices in real-world scenarios vary in an amount and types of HDR capabilities available to display the digital images, e.g., a range of luminosity values supported.

Further, environmental capabilities also affect HDR capabilities available from these display devices. A larger range of luminosity values is typically available in dark conditions, for instance, as opposed to a range of luminosity values available in bright conditions, even for the same display device. Because of this, conventional HDR techniques, when faced with these challenges, lack consistency in appearance across different display devices and in difference environmental conditions, e.g., with respect to color, tone, and so forth. This results in decreased functionality including a reduction in range and accuracy of display of digital image, diminished contrast, and so forth.

To address these and other technical challenges, gain map generation, embedding, and application techniques are described for high dynamic range digital image functionality. These techniques are configurable to dynamically adapt to HDR capabilities of display devices, e.g., hardware and software capabilities as well as environmental capabilities. These techniques also improve data storage efficiency by supporting an ability to maintain a single instance of a digital image within a digital file and yet support display in both a standard dynamic range and a high dynamic range, including values in between. These techniques further support a degree of control by a content creator, e.g., to control a mapping process between HDR and SDR, instead of relying on platform-specific default behaviors as involved in conventional techniques. As such, mechanisms are supported that promote consistency and predictability as to how digital images implement HDR functionality across applications, devices, and platforms. Backward compatibility is also supported as further described below while minimizing storage overhead and complexity of additional runtime display logic.

To do so in one example, a gain map is embedded along with a "base" digital image within a digital image file. In an implementation, the gain map is included as an optional tag to support processing by legacy devices, and thus supports backward compatibility. The base digital image is config- urable in accordance with a standard dynamic range (SDR) or a high dynamic range (HDR). In a SDR scenario, appli- cation of the gain map to the SDR digital image supports generation of a HDR digital image and values in between. Likewise, in an HDR scenario, application of the gain map to the HDR digital image supports generation of an SDR digital image and values in between. Thus, the gain map is usable to both increase a range of luminosity values or decrease a range of luminosity values to lighten or darken a corresponding digital image when rendered and displayed by a display device.

In an example of generating the gain map, an HDR mapping system receives an SDR digital image configured in accordance with a standard dynamic range and an HDR digital image configured in accordance with a high dynamic range. The HDR mapping system, in an implementation, then down samples the digital images to a lower resolution and converts the digital images to grayscale.

The HDR mapping system generates the gain map as a mapping between luminosity values of the SDR digital image (SDR) and luminosity values of the HDR digital image, e.g., as ratios performed using a $\log_2$ operation. This is performable for a single color plane for a grayscale example above, performable for each color channel (e.g., RGB), and so forth. The gain map is configured, for instance, such that a value of zero indicates no change, negative values darken, and positive values brighten. In an implementation, constants are included to avoid potential computational issues such as "divide by zero," which are separately selectable per color plane.

The HDR mapping system also determines, in an example, minimum, mean, and maximum values of each color plane of the gain map. Each color plane of the gain map is then remapped with an affine transform such that the minimum and maximum values map to zero and one, respectively. In other words, the HDR mapping system normalizes the values for the respective color planes. The HDR mapping system is also configurable to map each color plane using a gamma function, with each gamma value separately defined for each color plane.

The HDR mapping system then encodes the gain map. For example, a bit depth of "N" is selected (e.g., via a user input, predefined value) such as "N equals eight bits." The nor- malized gain map is then scaled to a range of "0" to "$2^N-1$" (e.g., 255 for eight bits), is quantized, and clipped.

As part of this, the HDR mapping system generates metadata that defines "how" the gain map is to be applied to the digital image as part of rendering the digital image for display. Examples of which include minimum and maxi- mum pixel luminance values, per channel gain map values, per channel gamma values, offset constants, HDR capacity values for scaling (e.g., interpolating) the gain map, an indication of whether the base digital image is configured in according with SDR or HDR, and so forth.

Preview functionality is also supported by the HDR mapping system. The HDR mapping system, for instance, applies the gain map to the digital image as part of rendering the digital image, which is then output in a user interface by a display device. In this way, a user is provided with insight into "how" the digital image appears as a result of process- ing by the gain map. This is usable to support a variety of inputs to provide a variety of edits, e.g., to change values of the gain map itself, set default scaling value to be included as part of the metadata, and so forth.

The HDR mapping system then generates a digital image file that includes, in one example, either the SDR or HDR digital image and embeds the gain map (e.g., having the edit) and the metadata. In this way, this single digital image file supports output of both an SDR digital image and an HDR digital image (and values in between) by storing a single digital image and a gain map.

An HDR display system is configured to render the digital image from the digital image file based on the gain map and associated metadata. To do so starting with a base SDR or HDR digital image, the HDR display system reads the gain map and associated metadata and uses the gamma, minimum and maximum values, and constants (i.e., the offsets) per color plane to invert the affine transformation and produce a $\log_2$ gain map.

The gain map, as appropriate, is resampled to match image dimensions of the digital image, e.g., bilinear, edge- preserving techniques, and so forth. Additionally, the gain map is scalable using a scaling factor based on HDR capabilities. The HDR capabilities, for instance, are based on hardware and software device capabilities of a display device to be used to display the digital image, environmental capabilities of an environment in which the display device is disposed, the value as set by a user in the preview example above, and so forth.

The gain map is then applied to the digital image included within the digital image file as part of a rendering operation. Luminosity values of the digital image, for instance, are multiplied by luminosity values specified by the gain map. This is performable, for instance, to incorporate the scaling factor to address HDR capabilities of the display device, which is usable to address the hardware, software, and environment capabilities. In this way, the digital image file (including the digital image, gain map, and metadata) improves memory storage efficiency, supports backward compatibility (e.g., to display an SDR digital image without using the gain map as an optional tag), and so forth. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example envi- ronment is not limited to performance of the example procedures.

Example Environment

FIG. 1 is an illustration of a digital medium environment 100 in an example implementation that is operable to employ gain map generation, embedding, and application for high dynamic range digital image functionality as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the com- puting device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

A display device 104 is communicatively coupled 106 to the computing device 102, e.g., via a wired or wireless connection. The display device 104 includes a display module 108 that is representative of functionality to display digital images, e.g., static digital images, digital videos, digital documents, and so forth. The display device 104 and display module 108 are configurable in a variety of ways to incorporate a variety of display technologies, examples of which include light emitting diodes (LEDs), organic light emitting diodes (OLEDs), projectors, and so forth.

In the illustrated example, the display module 108 includes support for high dynamic range (HDR) functionality, which is represented as an HDR display module 110. As previously described, high dynamic range (HDR) as applied to digital images refers to luminosity calculations (i.e., lighting) performed in a high dynamic range that supports a larger range of values when compared with values available in a standard dynamic range (SDR). Through use of high dynamic range functionality, bright objects in a digital appear brighter when displayed by the display device 104, dark objects appear darker, and details have increased visibility that otherwise are lost due to limitations in contrast ratios.

An ability to support HDR capability 112 by the HDR display module 110 is dependent on a variety of capabilities, examples of which include hardware device capabilities 114, software capabilities 116, and environmental capabilities 118. The hardware device capabilities 114 are dependent on an ability of hardware of the display device 104 to support a range of luminosity values, e.g., "how bright" and "how dark" pixels are activated. Software capabilities 116 refer to an ability of the display device 104 to process digital images to implement this functionality by the hardware device, e.g., support for associated drivers and so forth. Environmental capabilities 118 are dependent on environmental conditions of an environment, in which, the display device 104 is disposed, e.g., lighting conditions such as "how bright" and "how dark," glare, and so forth.

As previously described, conventional techniques used to implement and utilize HDR functionality are inconsistent, fractured, and lead to suboptimal results. Accordingly, a content processing system 120 as implemented by the computing device 102 is configured to overcome these challenges through use of an HDR mapping system 122 and an HDR display system 124. The HDR mapping system 122, for instance, is configured to generate a digital image file 126, which is illustrated as stored in a storage device 128.

The digital image file 126 includes a digital image 130, a gain map 132, and metadata 134. The HDR mapping system 122 is configured to generate the gain map 132 and metadata 134 that describes how to apply the gain map 132 to the digital image 130. The gain map 132, for instance, is configured to support adjustments to a digital image, e.g., to adjust luminosity values of the digital image for respective pixels based on the gain map 132.

The HDR mapping system 122, for instance, is configurable to generate the gain map 132 based on a first version of the digital image 130 as configured according to a standard dynamic range and a second version of the digital image as configured according to a high dynamic range. The gain map 132 is then generated by the HDR mapping system 122 as a ratio of corresponding luminosity values (e.g., for corresponding pixels) and as such maps these values to each other. The gain map 132, for instance, is configurable as a multiplier such at a value of "one" causes a luminosity value to remain the same, a value of "one-half" is less bright, a value greater that one has increased brightness, and so forth.

Accordingly, the digital image file 126 is configurable through use of the gain map 132 to include a single instance of a digital image 130 (e.g., either a SDR version of the digital image or a HDR version of the digital image) with the gain map 132 usable to recreate the opposite version. This is also usable to scale the luminosity values to varying degrees, and as such address differences in HDR capability 112 of the display device 104, which is not possible in conventional techniques. The techniques described herein thereby improve device operation, increase data storage efficiency, and improve display of the digital image 130 to address different device and environmental capabilities. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Gain Map and Metadata Generation

Figure 3:
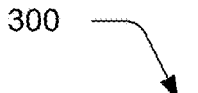
FIG. 3 depicts a system in an example implementation showing operation of a gain map generation module of FIG. 2 in greater detail as generating a gain map.
Figure 6:
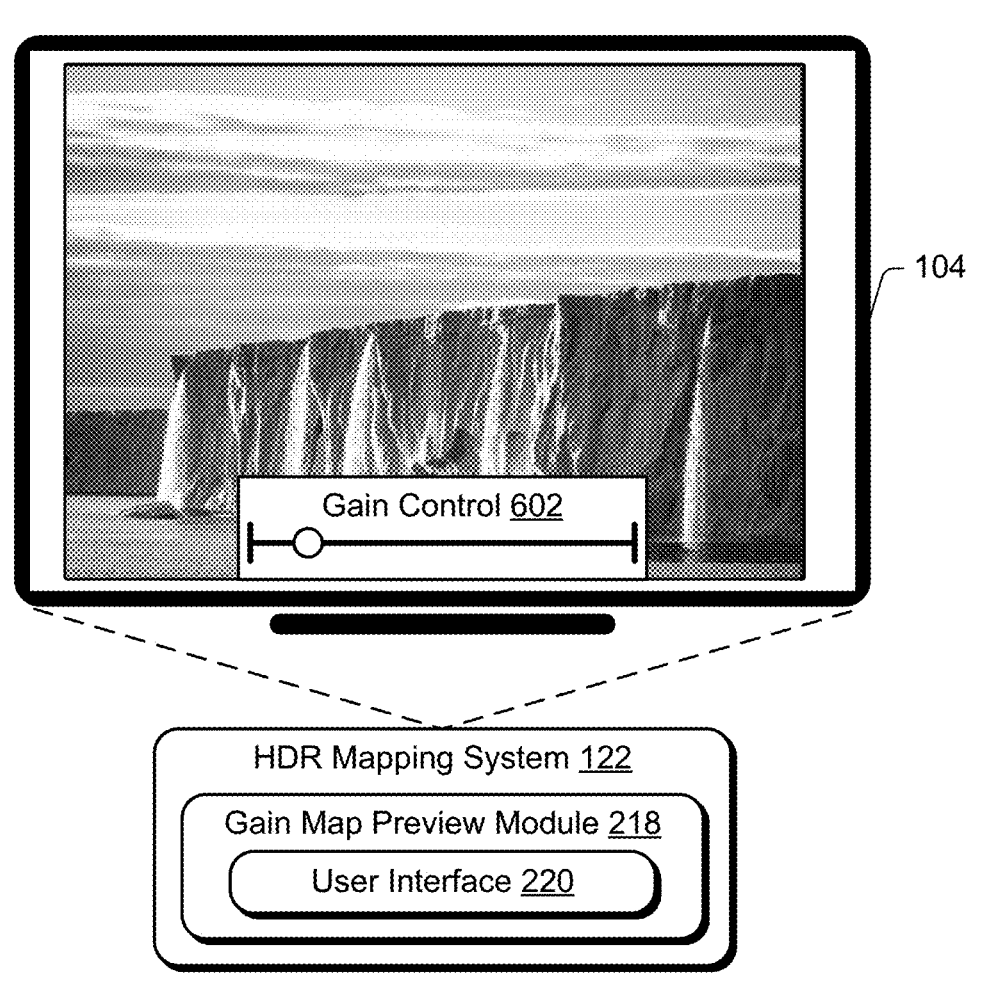
FIG. 6 depicts an example implementation of display of a preview in a user interface usable to edit a gain map.

FIG. 2 depicts a system 200 in an example implementation showing operation of the HDR mapping system 122 of FIG. 1 in greater detail as generating a digital image file that includes a base digital image, gain map, and metadata. FIG. 3 depicts a system 300 in an example implementation showing operation of a gain map generation module of FIG. 2 in greater detail as generating a gain map. FIG. 4 depicts another example implementation 400 showing operation of the gain map generation module of FIG. 2 in greater detail. FIG. 5 depicts an example implementation 500 of pseudo-code for generating a gain map as employed by a gain map generation module. FIG. 6 depicts an example implementation 600 of display of a preview in a user interface usable to edit a gain map. FIG. 7 depicts a procedure 700 in an example implementation of digital image file formation to include a digital image and embedded gain map and metadata.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6 in parallel with the example procedure 700 of FIG. 7.

To begin in this example, a standard dynamic range digital image and a high dynamic range digital image are received (block 702) by the HDR mapping system 122. These digital images are different versions (i.e., renditions) of a same digital image and are depicted as an SDR digital image 202 and an HDR digital image 204 in FIG. 2.

The HDR mapping system 122 includes a down sample module 208 that provides an option to generate down-sampled digital images 206 from the SDR digital image 202 and HDR digital image 204, e.g., to lower a resolution and conserve storage space. The HDR mapping system 122 also includes an option to convert the SDR digital image 202 and the HDR digital image 204 into grayscale digital images 210 by a grayscale conversion module 212. This is performed, for instance, to further reduce an amount of data processed through use of a single color channel as opposed to a plurality of color channels, e.g., red, green, blue. Use of a plurality of color channels (i.e., color planes) are also contemplated and discussed in the following description.

The SDR digital image 202 and the HDR digital image 204 are then received by a gain map generation module 214 to generate a gain map 132 (block 704), e.g., as supporting a plurality of color channels, grayscale, downsampled, and so on. This is performable in a variety of ways.

FIG. 3 depicts a system 300 in an example implementation showing operation of the gain map generation module 214 of FIG. 2 in greater detail as generating the gain map 132. The SDR digital image 202 and the HDR digital image 204 are received as inputs by the gain map generation module 214.

The gain map generation module 214 then generates the gain map 132 as a ratio between luminance values of the SDR digital image 202 with respect to luminance values of the HDR digital image 204, e.g., as a $\log_2$ operation. As a result, the gain map 132 is configurable to scale either one of the SDR digital image 202 or the HDR digital image 204 to adjust an amount of gain through either positive or negative adjustments.

FIG. 4 depicts another example implementation 400 showing operation of the gain map generation module 214 in greater detail. The gain map generation module 214 includes a gain map computation module 402 that is configured to generate an initial gain map 404. The gain map computation module 402, for instance, computes the initial gain map (G) as:

$$G = \log_2\ (HDR + k_1)/(SDR + k_2))$$

This is performable for a single color channel (e.g., grayscale) or a plurality of color channels (e.g., three color planes) as a 1-plane or 3-plane $\log_2$ gain map. The initial gain map 404 is configured such that a value of "zero" indicates no change is to be made, negative values indicate darkening, and positive values indicate brightening of corresponding pixels. The constants "$k_1$" and "$k_2$" are included in an example as relatively small positive values included to avoid computational issues such as "divides by zero." For color images, the constants are definable separately per color channel.

A gain map normalization module 406 is then employed to normalize values in the initial gain map 404 to generate a normalized gain map 408. To do so, the normalization module 406 determines a minimum, mean, and maximum value of each color plane in the initial gain map 404. In an implementation, the normalization module 406 is configured to exclude outliers (e.g., a defined percentage of the smaller and/or largest values) to improve robustness and accuracy in the calculation.

Each color plane of the initial gain map 404 is mapped by the normalization module 406 with an affine transform to cause the minimum and maximum values to map to values of zero and one, respectively.

The normalized gain map 408 is then passed to an encoding module 410 to generate the gain map 132. The encoding module 410 includes a gamma function 412. The gamma function 412 is configured to map each color channel of the normalized gain map 408 using a gamma value to model continuous change exhibited by the values in the gain map. The gamma value of the gamma function, in an implementation, is specified separately for each color channel.

The encoding module 410 also includes a bit-depth encoding module 414. An input is received, for instance, that specifies a bit depth "N" for encoding the gain map, e.g., "N=eight bits." The input is receivable via a user input, specified by a predefined value that is stored as part of the module, and so forth. The bit-depth encoding module 414 then scales the normalized gain map 408 to a range of "0" to "$2^N - 1$" (e.g., 255 for eight bits), quantizes, and clips. The gain map 132 is then output by the gain map generation module 214. FIG. 5 depicts an example implementation 500 of pseudocode for generating a gain map as employed by the gain map generation module 214 as implementing these features.

Returning again to FIG. 2, a metadata generation module 216 then generates metadata 134 based on the gain map 132 (block 706). As previously described, the metadata 134 describes "how" the gain map 132 is to be applied to a respective digital image when rendered.

The metadata 134 is configurable in a variety of ways. Examples of metadata 134 include a minimum, average (arithmetic mean), and maximum pixel luminance of the SDR digital image 202 and a minimum, average (arithmetic mean), maximum pixel luminance of the HDR digital image 204. The metadata 134 is also configurable to store per-channel minimum and maximum gain map 132 values, e.g., as $\log_2$ values. In another example, the metadata 134 includes per-channel gamma values and per-channel offset constants "$k_1$" and "$k_2$," as described above. The metadata 134 is also configured to include minimum and maximum HDR capacity values for scaling (e.g., interpolating) the gain map 132 and an indication of whether a base digital image to be included in a digital file is configured in accordance with a standard dynamic range (SDR) or a high dynamic range (HDR). Pixel luminance defining the minimum, average, and maximum values are definable as a "Y" component of a linear CIE XYZ color space. The minimum and maximum HDR capacity values are specified, in one example, in a $\log_2$ space and are set (e.g., by an author or authoring application) to control how the gain map 132 is scaled.

In an implementation, the HDR mapping system 122 supports preview functionality through use of a gain map preview module 218. The gain map preview module 218 is configured to output a user interface 220 to view an effect of the metadata 134 and the gain map 132 on rendering a base digital image to be included in a digital image file, e.g., the SDR digital image 202 or the HDR digital image 204.

FIG. 6 depicts an example implementation 600 of display of a preview in a user interface usable to edit a gain map. The gain map preview module 218 outputs a user interface 220 for display by the display device 104. The user interface 220 includes a display of a digital image rendered based on the gain map 132 and the metadata 134 as a preview (block 708)

of application of the gain map and metadata to be base digital image before storing as part of a digital image file.

In the illustrated example, the user interface 220 includes a gain control 602 output by a gain map edit module 222 to enter one or more edits. This is usable, for instance, to make changes to the gain map 132 itself, changes to a scaling factor included as part of the metadata 134, and so forth. A user viewing the user interface 220, for instance, interacts with the gain control 602 to adjust the scaling factor and therefore a degree, to which, the gain map 132 is applied to the digital image. Changes made via the gain control 602 are reflected in real time in the user interface 220. In this way, a user is given a degree of control in "how" the gain map 132 is applied through an edit (block 710) and subsequent appearance of the digital image when rendered using the gain map. This edit is then stored as part of the gain map 132 and/or the metadata 134.

Returning again to FIG. 2, a file embedding module 224 is then employed to generate a digital image file that embeds a base digital image 228, the gain map 132, and the metadata 134 (block 712). The base digital image 228 is selectable as either the SDR digital image 202 or the HDR digital image 204. The digital image file 226 is stored in a storage device 128 (block 714). The digital image file 226, as so configured, supports rendering and display of the base image itself in its native configuration (e.g., SDR or HDR) and changes to the other configuration through use of the gain map 132 and metadata 134 (block 716). Further discussion of rendering and display of the digital image file 126 is included in the following section and shown in corresponding figures.

Digital Image Display Using a Gain Map and Metadata

Figure 8:
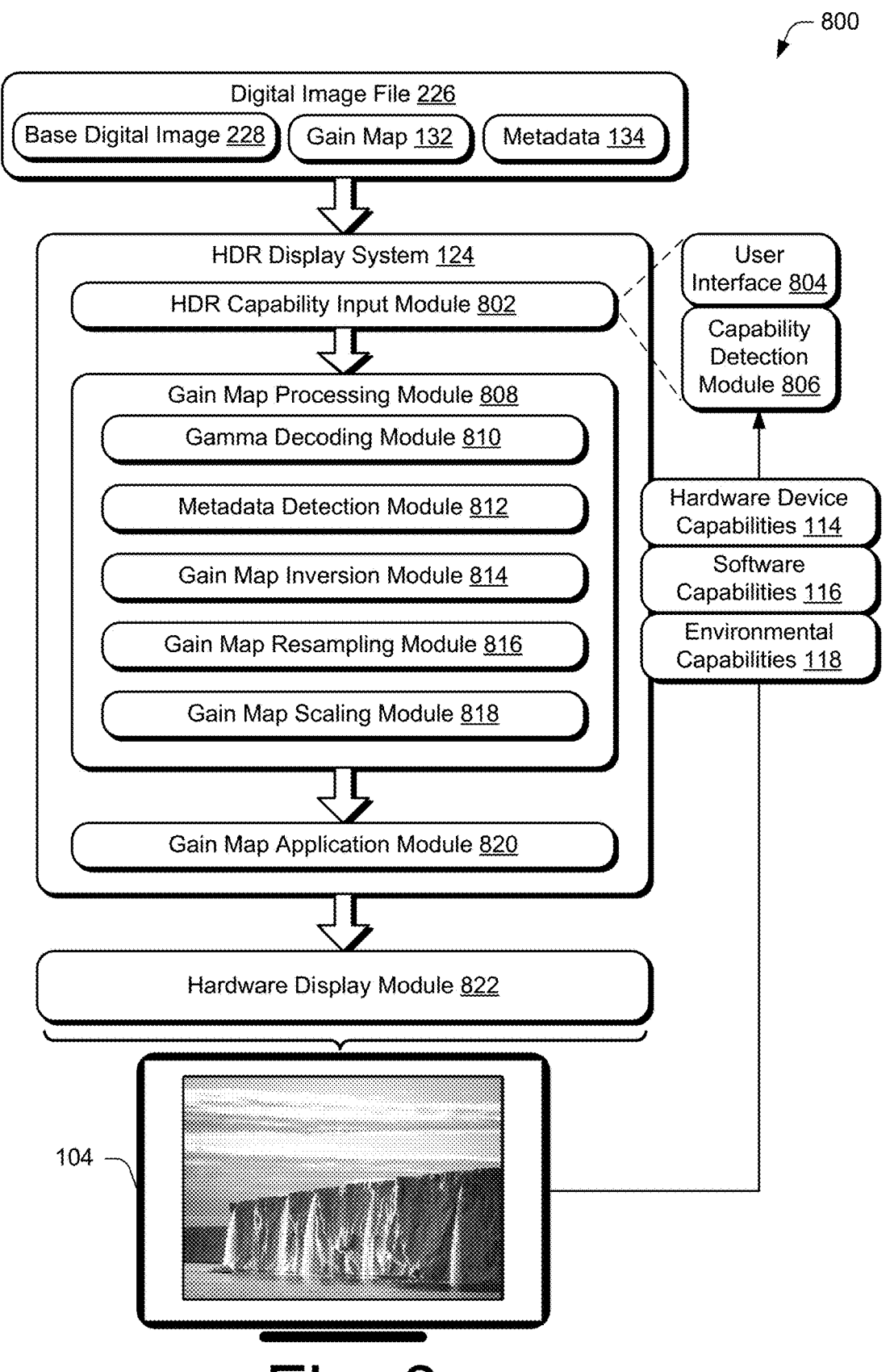
FIG. 8 depicts a system in an example implementation showing operation of an HDR display system of FIG. 1 in greater detail as applying a gain map and displaying a digital image.

FIG. 8 depicts a system 800 in an example implementation showing operation of the HDR display system 124 of FIG. 1 in greater detail as applying a gain map and displaying a digital image. FIG. 9 depicts an example implementation 900 of pseudocode for applying a gain map to a digital image. FIG. 10 depicts an example implementation 1000 of scaling a gain map as part of applying the gain map to a digital image. FIG. 11 depicts a procedure 1100 in an example implementation of application of a gain map to a digital image based on metadata, the gain map, metadata, and digital image embedded within a digital image file.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 8-10 in parallel with the example procedure 1100 of FIG. 11.

To begin in this example, a digital image file 226 is received (block 1102) by an HDR display system 124. A base digital image 228, gain map 132, and metadata 134 are then located from within the digital image file (block 1104).

An HDR capability input module 802 is then employed to receive an input defining high dynamic range (HDR) capabilities 112 available at a display device 104 (block 1106). This is performable in a variety of ways. In a first example, a user input is received via a user interface 804, e.g., through interaction with a control, entered numerical values, and so on. In another example, a capability detection module 806 detects the capabilities, e.g., via a handshaking operation with the display device 104 to detect hardware device capabilities 114, software capabilities 116, and/or environmental capabilities 118. The display device 104, for instance, includes a sensor to detect an amount of brightness in an environment, in which, the display device 104 is disposed and communicates that amount as environmental capabilities 118.

A gain map processing module 808 is then employed to process the gain map 132 based on the metadata 134 and the HDR capability 112. Functionality to do so is represented in FIG. 8 as a gamma decoding module 810, metadata detection module 812, gain map inversion module 814, gain map resampling module 816, and a gain map scaling module 818.

The gain map processing module 808 in this example starts with the base digital image 228 configured in accordance with a standard dynamic range in linear gamma. The gamma decoding module 810 is therefore utilized to undo the gamma encoding. The metadata detection module 812 is employed to read the gain map 132 and corresponding metadata 134. A gain map inversion module 814 then uses the gamma, minimum and maximum values, as well as the "$k_1$" and "$k_2$" offsets per color plane from the metadata 134 to invert the affine transform of the gain map 132 to produce a $\log_2$ gain map.

A map resampling module 816 is utilized, when appropriate, to resample the gain map to match dimensions of the base digital image 228. This is performable in a variety of ways, examples of which include bilinear sampling, edge-preserving techniques, and so forth.

The gain map scaling module 818 is configured to scale the gain map 132 based on high dynamic range (HDR) capabilities (block 1108) available at the display device 104. As previously described, the HDR capabilities 112 include hardware device capabilities 114, software capabilities 116, and/or environmental capabilities 118. In another implementation, this scaling is performed using a value set in the metadata 134, e.g., by a user that create the digital image.

A gain map application module 820 is then utilized to apply the scaled gain map as part of rendering the digital image (e.g., the base digital image 228) for display at the display device 104 (block 1110), e.g., a hardware display module 822 including a display panel such as an LED panel, OLED panel, projector, and so forth. The rendered digital image is then displayed by the display device 104 (block 1112).

The gain map application module 820, for instance, multiples the base digital image 228 by the gain map 132 as processed by the gain map processing module 808. If the gain map 132 involves a single color channel (e.g., a single plane such as grayscale), each of the color channels (RGB) of the base digital image 228 are multiplied by the same factor. In another example, the gain map 132 is configured separately for each color channel.

In an example in which the base digital image 228 is configured as having a standard dynamic range (SDR), the gain map 132 is applied as follows to produce a high dynamic range (HDR) version:

$$HDR = (SDR + k_2) \cdot 2^G - k_1$$

In an example in which the base digital image 228 is configured as having a high dynamic range (HDR), the gain map 132 is applied as follows to produce a standard dynamic range (SDR) version:

$$SDR = (HDR + k_1) \cdot 2^G - k_2$$

The result is a linear gamma rendition that can be composited with other SDR and HDR linear content or encoded with a standard HDR transfer curve (e.g., Perceptual Quantizer, Hybrid Log-Gamma) for compatibility with downstream APIs.

FIG. 9 depicts an example implementation 900 of pseudocode for applying a gain map to a digital image. FIG. 10 depicts an example implementation 900 of scaling a gain map as part of applying the gain map to a digital image. Scaling of the gain map is used to interpolate between SDR and HDR renditions. This is performable dynamically (e.g., at display time) to account for current display and viewing conditions as described above.

To scale the gain map 132, each pixel in the gain map is multiplied by a weight "W" in the range [−1,+1], e.g., by the HDR capability 112 as shown in FIG. 10. The scaling is performed, in one example, while the gain map values are in log space to provide a perceptually meaningful interpolation between the two renditions, i.e., the SDR digital image and the HDR digital image.

The weight "W" is selectable based on a variety of considerations. In one example, the weight W based on:

"H," the display device's current HDR capacity (e.g., based on a ratio of HDR to SDR white) expressed as a $\log_2$ value; or "$M_{lo}$" and "$M_{hi}$," the minimum and maximum HDR capacity values specified in the metadata.

In an example baseline implementation in which the base digital image is configured as having an SDR:

$$F = \mathrm{clamp}\left(\frac{H - M_{lo}}{M_{hi} - M_{lo}}, 0, 1\right)$$

If the base digital image is SDR, then the weight is set as "W=F." This causes the gain map 132 to be applied in the "forward" direction to map SDR to HDR. On the other hand, if the base digital image is HDR, then the weight is set as "W=F−1." This causes the gain map 132 to be applied in the "inverse" direction to map HDR to SDR. In this technique, when "H≤$M_{lo}$," then the result is an SDR digital image. On the contrary, when "H≥$M_{hi}$," the result is an HDR digital image.

When "$M_{lo}$<H<$M_{hi}$," the result is somewhere in between the SDR and HDR renditions. This is utilized to support scenarios in which a display device does not currently have enough HDR capabilities available (e.g., enough highlight headroom) to display a full HDR digital image without clipping. The resulting interpolated gain map is configurable, for instance, through scaling to configure the pixel values in the derived digital image approximately within the currently displayable range.

FIG. 10 depicts an example implementation 1000 of scaling a gain map as part of applying the gain map to a digital image. In this example, an HDR digital image 204 is scaled by multiplying a gain map 132 based on HDR capabilities 112 to differing degrees, e.g., by "1," "⅔", "⅓," and "0." Examples of application of these differing amounts of scale are illustrated, for instance, as a first digital image 1002, second digital image 1004, third digital image 1006, and fourth digital image 1008.

$\mathrm{Log}_2$ is selected in one example as a convenient representation that supports meaningful scaling based on current display capabilities. Also, changing a sign of the gain map (i.e., −G) makes it possible to work in the opposite direction, e.g., from HDR to SDR, instead of from SDR to HDR. This is performable at runtime by allowing the weight parameter "W" ranges from "−1" to "+1."

The gain map is configurable to support color (e.g., RGB, three planes) or grayscale, e.g., a single plane. A grayscale gain map involves less storage but does not support color effects often used in HDR-to-SDR tone mapping. For example, for when fine-tuning a SDR rendition to adjust both contrast and saturation and to capture both involves use of a color Gain Map.

A full resolution gain map is selectable to maximize accuracy at a cost of increased storage. A lower resolution gain map consumes fewer memory resources but may result in missing high-frequency details, e.g., small bright points of light. In an implementation, a one-quarter resolution is set for the gain map, e.g., ½ width and ½ height.

Regarding bit depth, the base digital image is stored in one example using ten bits per component. In another example, sufficient visual image quality is achieved by storing a base SDR digital image using eight bits per component. Doing so supports backward compatibility in the short term with existing, widely-adopted eight bit file formats and codecs such as JPEG. A bit depth of the gain map is configurable as eight bits per component.

Use of HDR transfer functions to represent an integer-coded rendition (e.g., a Hybrid Log-Gamma or Perceptual Quantizer) means that at least ten bits per component are used for that digital image. Otherwise, artifacts such as banding may occur. In a HLG or PQ rendition, approximately half the encoding space is used to represent the SDR content and the other half represents the HDR or overrange content. For an eight bit digital image, then one hundred and twenty eight levels represent the SDR content. In other words, each of the SDR and HDR digital images involve a seven bit representation. A gain map approach with an eight bit base digital image causes an increase to the SDR because SDR digital image can utilize the eight bit encoding space, and the HDR digital image is stored in another eight bit image, e.g., the gain map.

Gain maps are storable as uncompressed, lossless compressed, or lossy compressed. These techniques are configured to adapt dynamically to current display capabilities and viewing conditions. The gain map does so by supporting dynamic scaling (e.g., between [0,1]) to interpolate between SDR and HDR renditions. This ability, coupled with the metadata, supports runtime decisions by an application based on current display conditions.

The gain map is storable as an optional tag in a digital image file, thereby avoiding a storage cost of maintaining multiple versions. Gain maps are also optionally stored as external, fingerprinted data blobs.

These techniques also support user control of HDR-to-SDR tone mapping. Applications, for instance, are configurable to provide authors with an ability to produce both HDR and SDR renditions, leaving the author in control of the output. An application, for instance, can automatically generate both HDR and SDR digital images and derive the gain map 132 from the two. This is a fully automatic workflow, e.g., import a digital image, press "Auto," then "Export." In another example, an application supports an ability of a user to author an HDR digital image, then automatically compute a SDR digital image and then derive a gain map from the two. An application, for instance, supports user authoring of both SDR and HDR renditions, and then derives the Gain Map from the two. This is an "advanced" workflow that enables photographers to fine-tune image appearance across a range of devices.

In one example, the gain map is a 2D spatial map and therefore supports local adaptation. Adaptation may include, but is not limited to, a one-dimensional curve. Local adaptation is implemented typically when tone mapping HDR content for SDR displays.

These techniques support improved consistency and predictability by defining a space of possible dynamic range versions as a linear interpolation (e.g., in log space) between the SDR and HDR renditions. Therefore, an authoring application that provides a way to preview both SDR and HDR renditions (e.g., soft proofing) supports a reasonable sense of how the digital image may look when rendered and displayed on a different system.

These techniques also minimize complexity of additional runtime display logic. Applying the gain map to the base digital image at runtime involves a per-plane (1D) affine transform, image resampling, an 2× exponential, and multiplication implemented in one example using a few lines of shader code.

In a first example use case, a base digital image is SDR and is stored as an eight bit JPEG in a "Display P3" color space. The gain map and associated metadata are stored as an optional tag in the JPEG. The gain map is also stored as an eight bit JPEG compressed image, in either color or grayscale, and is storable at a lower resolution. In this use case, older image readers ignore the gain map tag and 2020" color space with a Hybrid Log-Gamma transfer curve. The gain map and associated metadata are stored as an optional tag. The gain map is also stored as a lossy compressed ten bit JPEG XL image (e.g., either color or grayscale) and is also storable at a lower resolution. Therefore, legacy image readers that do not support JPEG XL are not be able to read the base digital image. Newer image readers that support JPEG XL but do not support the gain map ignore the gain map tag and display the HDR digital image. Tone mapping of the HDR rendition, if any, is performable as application or system dependent. Newer image readers that support both JPEG XL and the gain map read the gain map and determine a degree to which the gain map is applied at display time. Since the base digital image is HDR, the gain map is usable to tone map the base digital image as part of producing an SDR digital image, which is the opposite of the two use cases above. This example is also applicable to other codecs and formats (e.g., H.265/HEIF, AV1/AVIF instead of JPEG XL) and other higher bit depths, e.g., 12 bit instead of ten bit. This example is also applicable to other transfer curves for the base digital image as implemented using HDR, such as a perceptual quantizer.

Metadata associated with the gain map is storable in a variety of ways, the following example of which involves an XMP representation. The following table lists examples of tag names.

| Tag | Value | Default | Notes |
|---|---|---|---|
| BaseRendition | SDR or HDR | SDR | |
| MinimumPixelLuminanceSDR | 32-bit float | 0 | Y of CIE XYZ |
| AveragePixelLuminanceSDR | 32-bit float | 0 | Y of CIE XYZ |
| MaximumPixelLuminanceSDR | 32-bit float | 0 | Y of CIE XYZ |
| MinimumPixelLuminanceHDR | 32-bit float | 0 | Y of CIE XYZ |
| AveragePixelLuminanceHDR | 32-bit float | 0 | Y of CIE XYZ |
| MaximumPixelLuminanceHDR | 32-bit float | 0 | Y of CIE XYZ |
| GainMapMin | 32-bit float × Planes | 0 | |
| GainMapMax | 32-bit float × Planes | 1 | |
| Gamma | 32-bit float × Planes | 1 | |
| OffsetSDR | 32-bit float × Planes | 1/64 | $k_2$ |
| OffsetHDR | 32-bit float × Planes | 1/64 | $k_1$ |
| HDRCapacityMin | 32-bit float | 0 | |
| HDRCapacityMax | 32-bit float | 1 | | display the SDR rendition. Newer image readers on SDR displays read the gain map tag but choose to ignore it and display the SDR digital image "as is." Newer image readers on HDR display devices read the gain map tag and choose a degree to which the gain map is applied at display time. This use case provides backward compatibility.

In another example use case, the base digital image is SDR and is stored as lossy compressed ten bit JPEG XL in the "Rec 2020" color space. The gain map and associated metadata are stored as an optional tag. The gain map is also stored as a lossy compressed ten bit JPEG XL image (e.g., either color or grayscale), and is stored at a lower resolution. In this use case, legacy image readers that do not support JPEG XL are not be able to read the digital image. Newer image readers that support JPEG XL but do not support the gain map ignore the gain map tag and display the SDR rendition. Newer image readers that support both JPEG XL and the gain map read the gain map and choose a degree to which the gain map 132 is applied at runtime. This example is also applicable to other codecs and formats (e.g., H.265/ HEIF, AV1/AVIF instead of JPEG XL) and other higher bit depths, e.g., twelve bit instead of ten bit.

In a third use case, the base digital image is HDR and is stored as lossy compressed ten bit JPEG XL in the "Rec In one example of metadata using the above tags:

hdrgm:BaseRendition="SDR"
hdrgm:MinimumPixelLuminanceSDR="0.0"
hdrgm:AveragePixelLuminanceSDR="0.053161"
hdrgm:MaximumPixelLuminanceSDR="1.000616"
hdrgm:MinimumPixelLuminanceHDR="0.0"
hdrgm:AveragePixelLuminanceHDR="0.108178"
hdrgm:MaximumPixelLuminanceHDR="11.36349
2" hdrgm:GainMapMin="0"
hdrgm:GainMapMax="3.554440,3.473331,3.37464
7" hdrgm:Gamma="0.394995,0.440560,0.482004"
hdrgm:OffsetSDR="0.015625"
hdrgm:OffsetHDR="0.015625"
hdrgm:HDRCapacityMin="0"
hdrgm:HDRCapacityMax="2.3"

For image formats that support a single XMP block, the metadata is storable inside that block. For multi-image formats that support multiple XMP blocks (one per auxiliary image), the metadata is storable in a XMP block associated with the gain map image.

The gain map 132 is storable in a variety of ways. In a first example, the gain map 132 is stored as a standard JPEG-compressed data stream. To embed this data stream within a JPEG file, the data may need to be split up into multiple parts, e.g., each less than 65 KB. Each part includes an app marker, byte length, unique header label, the part number (index), and the total number of parts.

| Data | Byte Length | Notes |
|---|---|---|
| APP15 (0xEF) | 2 | App marker |
| N | 2 | Total length of this part, in bytes |
| HDR_GAIN_MAP | 13 | Unique header label (12 bytes) + null-term char (1 byte) |
| Part Index | 1 | Index of this part (1, 2, 3, etc.) |
| Part Count | 1 | Total number of parts |
| Data | N − 15 | JPEG-encoded stream (for this part) |

For gain maps larger than 65 KB, the data is split into multiple parts, e.g., a 150 KB gain map is split into three parts. The reader re-assembles the parts by concatenating the data blocks, similar to other types of large data blocks.

This technique is compatible with legacy application that do not support gain maps. These applications, as compliant with the JPEG standard, ignore the gain map and simply read and display the base digital image. The metadata for the gain map is found in the main XMP block as described in the previous section.

In another example, JPEG XL uses a Base Media File Format (BMFF) as its container. The gain map image is stored as a separate box with a unique box type, e.g., hrgm. The content of the box is a raw JPEG XL code stream representing the compressed gain map. This example is compatible with legacy applications that do not support gain maps as those apps ignore the gain map box and therefore read and display the base digital image from the main image, e.g., "jxlc box." The metadata for the gain map is found in the main XMP block. A variety of other examples are also contemplated.

Gain map generation, embedding, and application techniques are described for high dynamic range digital image functionality. These techniques are configurable to dynamically adapt to HDR capabilities of display devices, e.g., hardware and software capabilities as well as environmental capabilities. These techniques also improve data storage efficiency by supporting an ability to maintain a single instance of a digital image within a digital file and yet support display in both a standard dynamic range and a high dynamic range, including values in between. These techniques further support a degree of control by a content creator, e.g., to control a mapping process between HDR and SDR, instead of relying on platform-specific default behaviors as involved in conventional techniques. As such, mechanisms are supported that promote consistency and predictability as to how digital images implement HDR functionality across applications, devices, and platforms. Backward compatibility is also supported while minimizing storage overhead and complexity of additional runtime display logic.

Example System and Device

Figure 12:
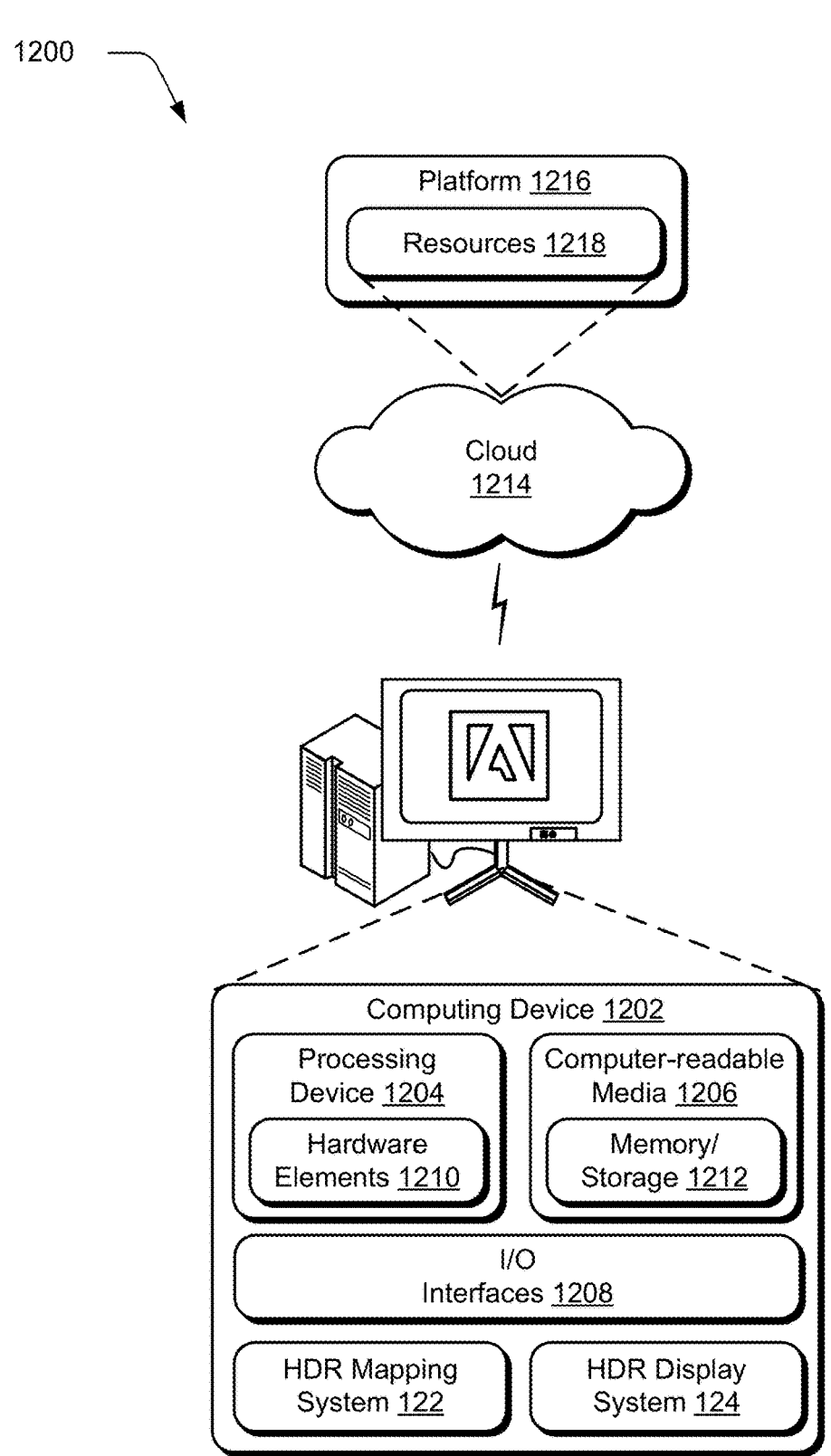
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the HDR mapping system 122 and HDR display system 124. The computing device 1202 is configurable, for example, as a server of a service provider, a device associated with a client (e.g., a client device), an on-chip system, and/or any other suitable computing device or computing system.

The example computing device 1202 as illustrated includes a processing device 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1204 is representative of functionality to perform one or more operations using hardware. Accordingly, the processing device 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212 that stores instructions that are executable to cause the processing device 1204 to perform operations. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing device 1204. The instructions and/or functions are executable/operable by one or more articles of manufacture (for example, one or more computing devices 1202 and/or processing devices 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

In implementations, the platform 1216 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processor, the method comprising:

generating, by the processor, a gain map based on a digital image, the gain map configured to adjust an amount of gain of the digital image between a high dynamic range (HDR) and a standard dynamic range (SDR), the gain map including pixel-by-pixel adjustment values supporting scalable continuous interpolation per color channel between the HDR and the SDR;

generating, by the processor, metadata based on the gain map, the metadata describing how the gain map is to be applied to the digital image as part of rendering by controlling a mapping between the HDR and the SDR based on gamma values per color channel, a minimum range capacity value, and a maximum range capacity value in support of the scalable continuous interpolation between the HDR and SDR;

embedding, by the processor, the gain map, the metadata, and the digital image within a digital image file; and storing, by the processor, the digital image file in a storage device.

2. The method as described in claim 1, wherein the generating the gain map is based on a first version of the digital image configured according to the standard dynamic range (SDR) and a second version of the digital image configured according to the high dynamic range (HDR).

3. The method as described in claim 2, wherein the gain map is a ratio of luminosity or color values of the first and second versions of the digital image.

4. The method as described in claim 1, further comprising:

displaying a preview of the digital image in a user interface as rendered based on the gain map and the metadata;

receiving an edit to the gain map based on an input received via the user interface; and wherein the embedding is performed using gain map having the edit.

5. The method as described in claim 1, wherein the gain map includes a plurality of said gain maps configured for respective color channels of the digital image.

6. The method as described in claim 1, wherein the metadata describes:

minimum, average, and maximum pixel luminance values;

the gamma values per color channel; or the minimum and maximum capability value for interpolating the gain map.

7. The method as described in claim 1, further comprising displaying the digital image by a display device based on rendering the digital image using the gain map and the metadata from the digital image file.

8. The method as described in claim 7, wherein the rendering is based at least in part on an input specifying a high dynamic range (HDR) capability of the display device.

9. The method as described in claim 8, wherein the input specifies an amount that the gain map is to be scaled as part of the rendering.

10. The method as described in claim 1, wherein the digital image is configured as having the standard dynamic range (SDR) and the gain map and metadata are configured for use in rendering the digital image for display as having the high dynamic range (HDR).

11. The method as described in claim 1, wherein the digital image is configured as having the high dynamic range (HDR) and the gain map and metadata are configured for use in rendering the digital image for display as having the standard dynamic range (SDR).

12. A computing device comprising:

a processor;

a sensor;

a display device; and a computer-readable storage medium storing instructions that, responsive to execution by the processor, causes the processor to perform operations including:

receiving an input defining high dynamic range (HDR) capabilities available at the display device;

detecting, using the sensor, an environmental capability of an environment, in which, the display device is disposed;

scaling a gain map embedded as part of a digital image based on the high dynamic range (HDR) capabilities available at the display device defined by the input and the detected environmental capability, the scaling based on metadata having a minimum range capacity value, a maximum range capacity value, and gamma values per color channel describing how the gain map is to be applied to the digital image in support of scalable continuous interpolation between the HDR and a standard dynamic range (SDR) by controlling a mapping between high dynamic range and standard dynamic range, the gain map including pixel-by-pixel adjustment values supporting the scalable continuous interpolation per color channel between the HDR and the SDR; and rendering the digital image for display by the display device by applying the scaled gain map to the digital image.

13. The computing device as described in claim 12, wherein the high dynamic range (HDR) capabilities are based on hardware device capabilities of the display device.

14. The computing device as described in claim 12, wherein the environmental capability is an amount of brightness of the environment, in which, the display device is disposed.

15. The computing device as described in claim 12, further comprising the display device configured to display the digital image having the applied gain map.

16. The computing device as described in claim 12, wherein the digital image is configured as having a standard dynamic range (SDR) and the gain map is configured to scale the digital image using the gain map based on the high dynamic range (HDR) capabilities available at the display device.

17. The computing device as described in claim 12, wherein the digital image is configured as having the high dynamic range (HDR) and the gain map is configured to scale the digital image using the gain map based on the high dynamic range (HDR) capabilities available at the display device.

18. A method comprising:

receiving an input defining high dynamic range (HDR) capabilities available at a display device;

detecting, using a sensor, an environmental capability of an environment, in which, the display device is disposed;

scaling a gain map embedded as part of a digital image based on the high dynamic range (HDR) capabilities available at the display device defined by the input and the detected environmental capability, the scaling based on metadata having a minimum range capacity value, a maximum range capacity value, and gamma values per color channel describing how the gain map is to be applied to the digital image in support of scalable continuous interpolation between the HDR and a standard dynamic range (SDR) by controlling a mapping between range the HDR and the SDR that supports the scalable continuous interpolation per color channel between the HDR and the SDR, the gain map including pixel-by-pixel adjustment values supporting the scalable continuous interpolation per color channel between the HDR and the SDR; and rendering the digital image for display by the display device by applying the scaled gain map to the digital image.

19. The method as described in claim 18, wherein the high dynamic range (HDR) capabilities are based on hardware device capabilities of the display device.

20. The method as described in claim 18, wherein the environmental capability is an amount of brightness of the environment, in which, the display device is disposed.

\* \* \* \* \*